United States Patent
Mazzurco

[19]

[11] Patent Number: 5,933,591
[45] Date of Patent: Aug. 3, 1999

[54] APPARATUS FOR ISOLATING A FAULT ON A LOCAL AREA NETWORK

[75] Inventor: Anthony Mazzurco, Plano, Tex.

[73] Assignee: Alcatel USA Sourcing, L.P., Plano, Tex.

[21] Appl. No.: 08/757,518

[22] Filed: Nov. 27, 1996

[51] Int. Cl.$^6$ .................................................. G06F 11/20
[52] U.S. Cl. ..................................... 395/182.02; 370/220
[58] Field of Search ...................... 395/182.02; 370/216, 370/217, 218, 219, 220, 221, 222, 223, 224, 225, 226, 227, 228; 379/273, 279

[56] References Cited

U.S. PATENT DOCUMENTS

| | | | |
|---|---|---|---|
| 4,625,082 | 11/1986 | Kelly | 379/273 |
| 4,692,918 | 9/1987 | Elliot et al. | 370/85 |
| 5,329,521 | 7/1994 | Walsh et al. | 370/16 |

FOREIGN PATENT DOCUMENTS 0 416 942 A2   3/1991   European Pat. Off. ........ H04L 12/40

*Primary Examiner*—Robert W. Beausoliel, Jr.
*Assistant Examiner*—Pierre Eddy Elisca
*Attorney, Agent, or Firm*—Baker & Botts, L.L.P.

[57] ABSTRACT

A metallic bridge (16) is operable to join a first local area network (12) with a second local area network (14). Processor cards (18, 20 and 22) are deployed to provide redundant protection. Processor card (18*a*) is attached to LAN A (12) and processor card (18*b*) is attached to LAN B (14). In the event of a single point of failure in either the processor cards (18, 20 and 22) or the local area network media or a power failure, the metallic bridge (16) will open and separate the local area networks (12, 14). Operation will continue on the operable local area network.

15 Claims, 2 Drawing Sheets

5,933,591

APPARATUS FOR ISOLATING A FAULT ON A LOCAL AREA NETWORK

TECHNICAL FIELD OF THE INVENTION

The present invention relates in general to local area networks and more particularly to an apparatus for isolating a fault on a local area network.

BACKGROUND OF THE INVENTION

In order to insure data integrity through a network, systems often employ redundant hardware. If, however, the network itself is a single point of failure, the redundant hardware is useless and failure will occur without an opportunity for recovery. To remedy this situation, systems of interconnected local area networks have been proposed. In these networks, redundant hardware attaches physically to two different local area networks. If one network becomes a single point of failure, operation switches to the second network. This system, however, is expensive since it increases the number of network cards needed to operate the system. Each device would need an additional network card to tie into the redundant LAN. Therefore, it is desirable to provide fault protection in a local area network system without duplicating hardware for redundancy.

SUMMARY OF THE INVENTION

From the foregoing, it may be appreciated that a need has arisen for a local area network with fault isolation without unnecessary redundant hardware. In accordance with the present invention, an apparatus for isolating a fault on a local area network is provided which substantially eliminates or reduces disadvantages and problems associated with prior redundant local area network systems.

In accordance with one embodiment of the present invention, an apparatus for isolating a fault on a local area network includes a first local area network and a second local area network. The first local area network and the second local area networks are identical. Also included is a metallic bridge which couples the first local area network with the second local area network, forming a larger local area network. The metallic bridge is operable to decouple the larger local area network into an operable local area network and an inoperable local area network upon a failure in either the first local area network or the second local area network.

The present invention provides various technical advantages over conventional local area network protection devices. For example, one technical advantage is an inexpensive way to provide redundancy in a local area network. Another technical advantage is that failures in both network devices and the local area network media can be isolated quickly without complex equipment. Additionally, once the local area network splits into segments, the devices can determine which of the new segments is viable and continue operation on that segment with minimal interruption. Yet another technical advantage is the ability to continue to pass LAN traffic even during a duration of a failure by allowing protected services to continue to operate. Other technical advantages are readily apparent to one skilled in the art from the following figures, descriptions and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
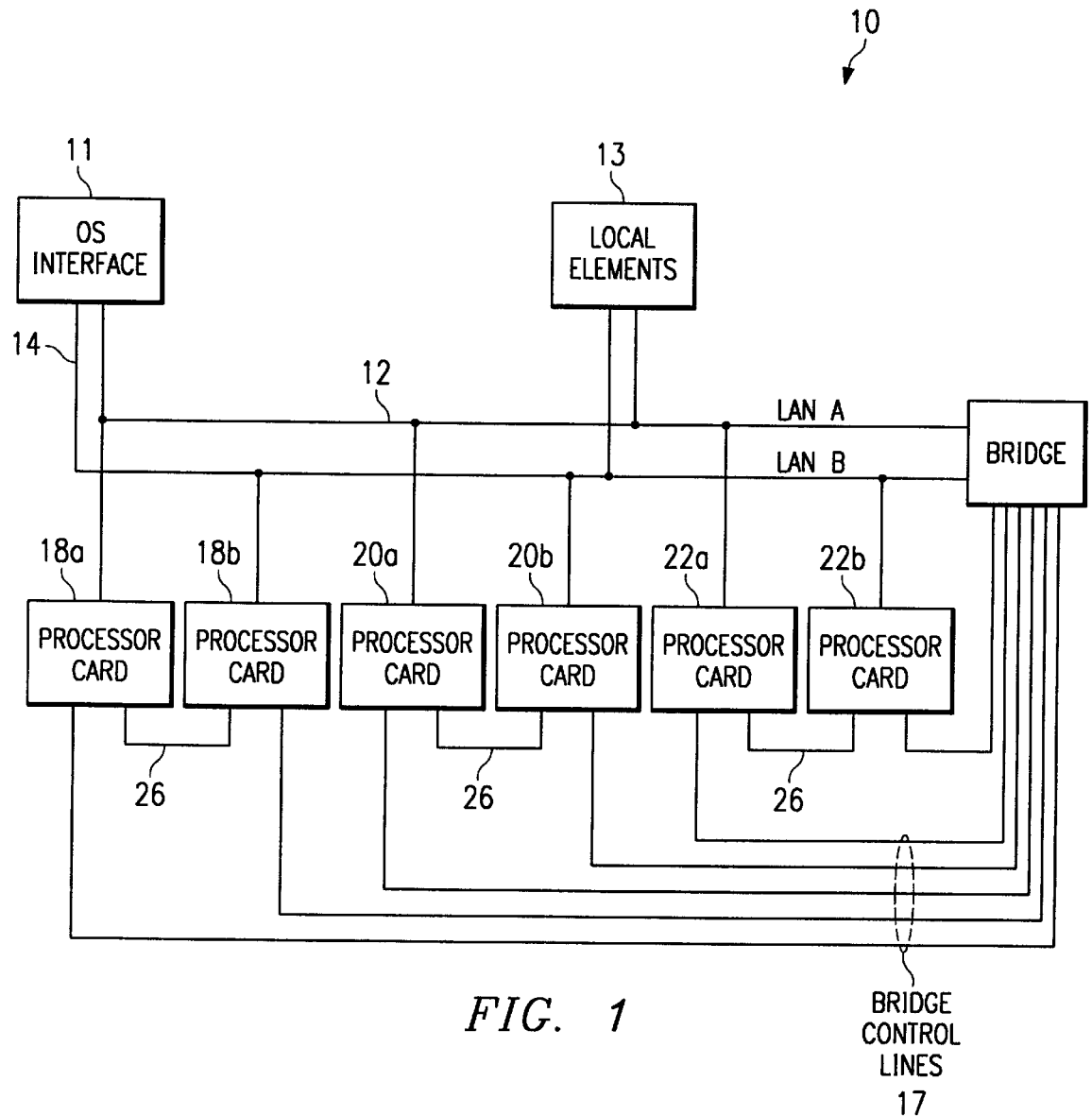
FIG. 1 provides a block diagram of a local area network system utilizing a metallic bridge.

FIG. 1 provides a block diagram of a network system 10 utilizing a metallic bridge. Network system 10 includes a local area network (LAN A) 12 and a local area network (LAN B) 14 connected by a metallic bridge 16. An operating system (OS) interface 11 connects to LAN A 12 and LAN B 14 and is used to route data from the operating system to the proper elements on these local area networks. In this example, OS interface 11 is not shown to provide protected service due to a circuit failure though such protection may be implemented as desired. A plurality of network processor card pairs 18, 20, and 22 connect to LAN A 12 and LAN B 14. In this example, the services provided by network processor card pairs is protected in case of a circuit or LAN failure. Therefore, each processor card pair is deployed to provide redundant protection for the specially designated access point; for example, a processor card 18a and a processor card 18b of processor card pair 18. Each pair of processor cards, 18a and 18b, can communicate with each other via a connection link 26. Each processor card pair 18, 20, and 22 attaches to metallic bridge 16 via bridge control lines 17. LAN A 12 and LAN B 14 also connect to a number of local elements 13 which are processing entities that can source or sink information between itself and the operating system or processor cards. As shown, local elements 13 are not protected with redundant circuitry though such protection may be implemented as desired.

In operation, metallic bridge 16 connects LAN A 12 and LAN B 14, essentially forming one larger LAN. Pairs of processor cards, such as 18a and 18b, connect to the larger LAN, with processor card 18a attaching to LAN A 12 and processor card 18b attaching to LAN B 14. Since each processor card in a processor card pair are identical, only one operates at any given time. Each processor card in a processor card pair can negotiate between each other via connection link 26 to determine which one is to be in operation. Network processor cards 20 and 22 operate in the same manner.

If a failure occurs, either in a processor card pair 18, 20, and 22 or in LAN A 12 or LAN B 14, metallic bridge 16 opens in response to signals sent over bridge control lines 17, decoupling LAN A 12 from LAN B 14, resulting in two separate segments, one for LAN A 12 and one for LAN B 14. Each pair of processor cards 18a and 18b are now on a separate LAN. The failure is now isolated to either LAN A 12 or LAN B 14 which can be detected by the processor card pairs. Operations continue on the operable LAN through the corresponding processor card.

Figure 2:
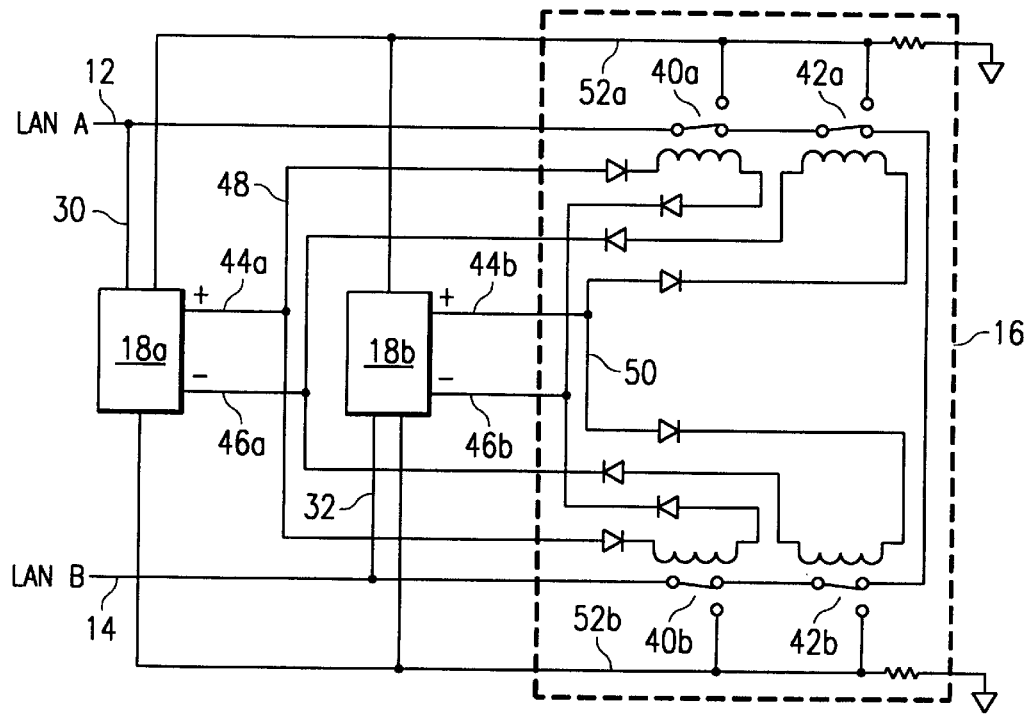
FIG. 2 provides a detailed layout of the metallic bridge.

FIG. 2 provides a detailed drawing of metallic bridge 16. One pair of processor cards, 18a and 18b, is illustrated. Other pairs of processor cards 20 and 22 attach similarly. Processor card 18a connects with LAN A 12 via line 30. Similarly, processor card 18b connects with LAN B 14 via line 32. Switches 40a, 40b, 42a, and 42b are all activated in the closed position, thus connecting LAN A 12 and LAN B 14 together. Switches 40a, 40b, 42a, and 42b are relay switches in the primary embodiment, although it is clear that any of a variety of switching means can be employed. Processor card 18a has a source output 44a and a sink input 46a. Each must be active to keep LAN A 12 and LAN B 14 joined. Processor card 18b also has a source output 44b and a sink input 46b. Again, each must be active to keep LAN A 12 and LAN B 14 joined. Source output 44a attaches to line 48 which in turn connects with switch 40a which in turn connects to sink input 46b which connects to switch 40b which connects back to source output 44a. Similarly, source output 44b connects via line 50 to switch 42b which in turn connects to sink input 46a which connects to switch 42a which connects back to the source output 44b. Finally processor card 18a and processor card 18b connect to monitoring lines 52a and 52b.

In operation, switches 40a, 40b, 42a, and 42b default to the closed position, connecting LAN A 12 and LAN B 14 together and forming one larger LAN. When both processor cards 18a and 18b are functioning normally, their respective source outputs and sink inputs are active. As an example of operation, a signal will source at source output 44a, forcing switch 40a and 40b into the closed position and the signal will then sink at the sink input 46b. If failure in processor card 18a causes a failure to source the signal or if it detects a problem on the LAN and stops sourcing source output 44a, switches 40a and 40b will open. If processor card 18b fails to sink the signal properly or intentionally terminates the signal due to a detected fault, switches 40a and 40b will open. Similarly, source output 44b sources a signal to close switches 42a and 42b. The signal sinks at sink input 46a. Failure in the source or sink of this pair of switches will cause them to open. By using two switches per source and sink and four switches overall, redundancy is achieved. As long as one of the four switches are open, LAN A 12 and LAN B 14 will separate. A power failure would cause all four switches to open.

If there is a failure in the local area network media, LAN A 12 and LAN B 14 can still be separated. For example, if there is a failure in the media of LAN A 12, when processor card 18a attempts to communicate across LAN A 12, its attempt will be unsuccessful. Processor card 18a will then wait a random amount of time and retry transmission. After a certain amount of attempts, processor card will give the signal to open the bridge to separate LAN A 12 and LAN B 14.

During operation, monitoring points on monitoring line 52a and 52b determine the position of the switches. If the switches are all in the closed position, then the monitoring line should be grounded and an impedance to ground will be seen. If a switch moves to the open position, then the monitoring line will be attached to one of LAN A 12 and LAN B 14 and the impedance to ground will cease. The monitoring lines can also determine if all switches open properly in the event of a failure to identify a switch failure.

Figure 3:
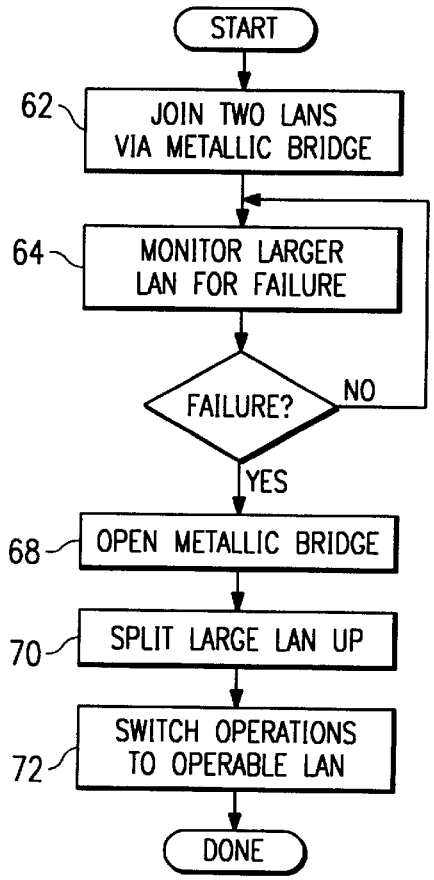
FIG. 3 provides a flow chart of a method of operation.

FIG. 3 is a flowchart of a method for isolating a fault on a local area network. Initially, two identical local area networks, LAN A 12 and LAN B 14, join to form a larger LAN via metallic bridge 16 in step 62. The larger LAN is monitored continuously for failure in step 64. If there is no failure, step 62 repeats. If there is a failure, metallic bridge 16 opens in step 68. Step 70 involves LAN A 12 and LAN B 14 splitting apart, forming an operable LAN and an inoperable LAN. All operations switch to the operable LAN in step 72.

Thus, it is apparent that there has been provided, in accordance with the present invention, an apparatus for isolating a fault on a local area network that satisfies the advantages set forth above. Although the preferred embodiment has been described in detail, it should be understood that various changes, substitutions, and alterations readily ascertainable by one skilled in the art can be made herein without departing from the spirit and scope of the present invention as defined by the following claims.

What is claimed is:

1. An apparatus for isolating a fault on a local area network comprising:
    a first local area network;
    a second local area network, the second local area network being identical to the first local area network; and
    a first processor coupled to the first local area network;
    a second processor coupled to the second local area network;
    a metallic bridge coupling the first local area network with the second local area network to form a larger local area network, the metallic bridge operable to decouple the first local area network from the second local area network upon a failure detected by either the first processor or the second processor, the first processor providing a first control signal to the second processor through the metallic bridge to control the decoupling of the first local area network from the second local area network, the second processor providing a second control signal to the first processor through the metallic bridge to control the decoupling of the first local area network from the second local area network.

2. The apparatus of claim 1, wherein the metallic bridge further comprises a plurality of switches coupled to the first and second local area networks, the plurality of switches operable to open in response to the first and second control signals upon a failure in order to separate the first local area network from the second local area network.

3. The apparatus of claim 2, further comprising a plurality of monitoring points on the first and second local area networks, the monitoring points operable to determine the position of the plurality of switches.

4. The apparatus of claim 2, wherein the first and second processors are deployed as a series of redundant pair of processing cards.

5. The apparatus of claim 4, wherein the first control signal is a first source output of the first processor coupled to a first redundant pair of the plurality of switches which couples to a second sink input on the second processor card; wherein the second control signal is a second source output of the second processor coupled to a second redundant pair of the plurality of switches which couples to a first sink input of the first processor.

6. The apparatus of claim 5, wherein the first redundant pair of switches is operable to open upon failure in either the first source output or the second sink input.

7. The apparatus of claim 5, wherein the second redundant pair of switches is operable to open upon failure in either the second source output or the first sink input.

8. The apparatus of claim 5, wherein opening of either the first redundant pair of switches or the second redundant pair of switches is operable to split the first and second local area networks into an operable local area network and an inoperable local area network.

9. A method for protecting the data integrity on a local area network comprising:
    joining a first local area network and a second local area network with a metallic bridge to form a larger local area network;
    providing a first control signal from a first processor to a second processor through the metallic bridge;

providing a second control signal from the second processor to the first processor through the metallic bridge;

monitoring the larger local area network for failures;

opening the metallic bridge in response to the first and second control signals upon detection of a failure;

splitting the larger local area network into an operable local area network and an inoperable local area network; and switching operations to the operable local area network.

10. The method of claim 9, wherein the opening step further comprises the step of opening a plurality of switches in response to the first and second control signals upon a failure in any of the first and second processors or the first and second local area networks.

11. The method of claim 10, wherein the monitoring step further comprises the step of monitoring a monitoring line to determine the position of the plurality of switches.

12. A system for protecting data integrity of a network, the system comprising:

a first local area network;

a second local area network, the second local area network identical to the first local area network;

a plurality of processing cards, the plurality of processing cards deployed as a series of redundant pair of processing cards, a first processor card of a first redundant pair of processing cards being coupled to the first local area network, a second processor card of the first redundant pair of processing cards being coupled to the second local area network;

a metallic bridge, the metallic bridge coupling the first local area network with the second local area network forming a larger local area network, the first processor card operable to provide a first control signal to the second processor card through the metallic bridge, the second processor card operable to provide a second control signal to the first processor card through the metallic bridge, the metallic bridge including a first redundant pair of switches and a second redundant pair of switches, the first and second redundant pair of switches operable to open in response to the first and second control signals upon a failure in any of the plurality of processing cards or in either of the first local area network or the second local area network, the metallic bridge decoupling the larger local area network into an operable local area network and an inoperable local area network.

13. The apparatus of claim 12, wherein the first control signal is a first source output of the first processor card coupled to the first redundant pair of switches which couples to a second sink input on the second processor card, wherein the second control signal is a second source output of the second processor card coupled to the second redundant pair of switches which couples to a first sink input of the first processor card.

14. The apparatus of claim 13, wherein the first redundant pair of switches is operable to open upon failure in either the first source output or the second sink input.

15. The apparatus of claim 13, wherein the second redundant pair of switches is operable to open upon failure in either the second source output or the first sink input.

* * * * *